Dec. 20, 1938.　　　E. H. TAYLOR　　　2,140,864
FUSE SOLDERING MECHANISM
Filed Feb. 14, 1936　　2 Sheets-Sheet 1
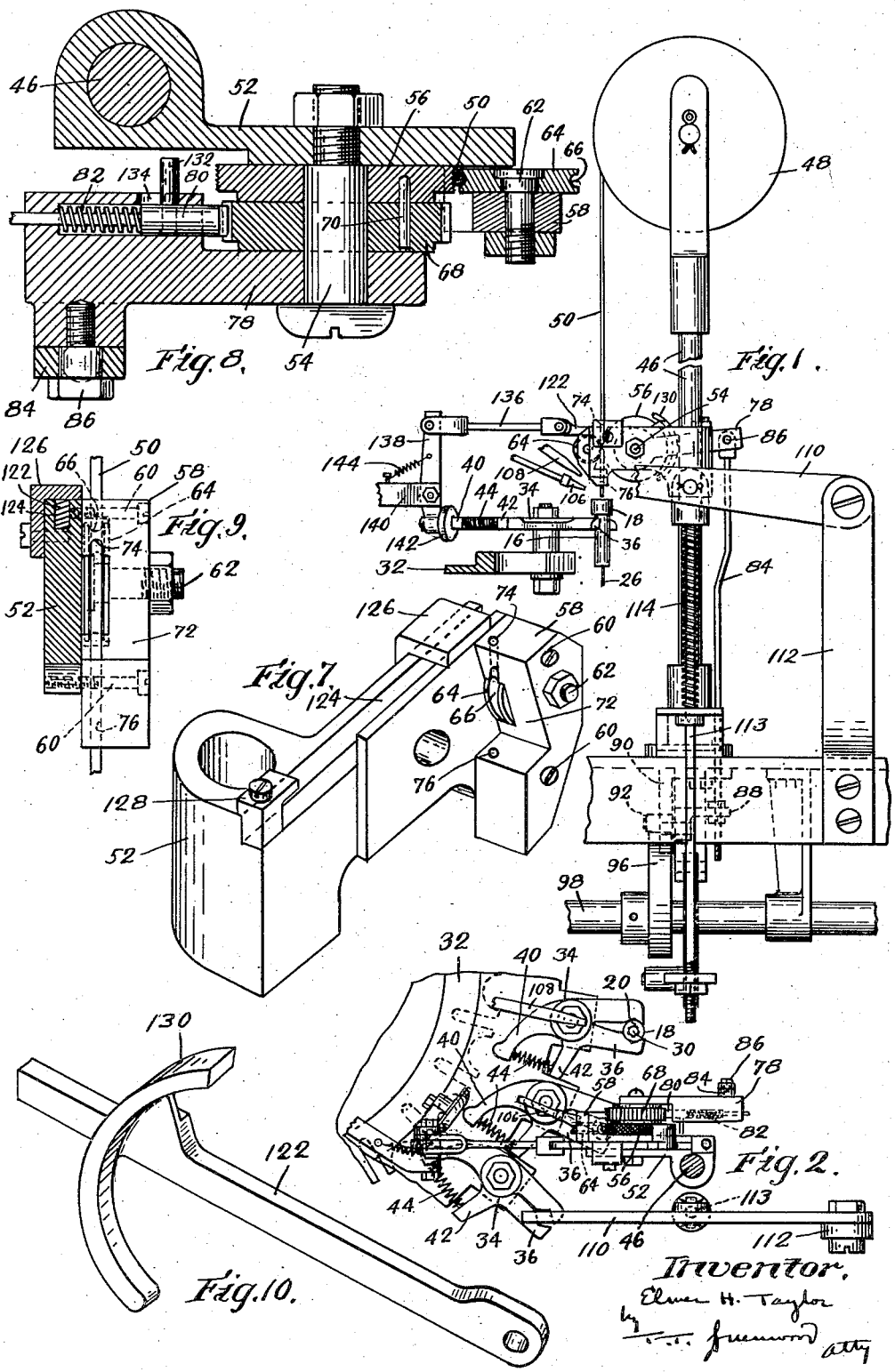

Dec. 20, 1938.  E. H. TAYLOR  2,140,864
FUSE SOLDERING MECHANISM
Filed Feb. 14, 1936  2 Sheets-Sheet 2
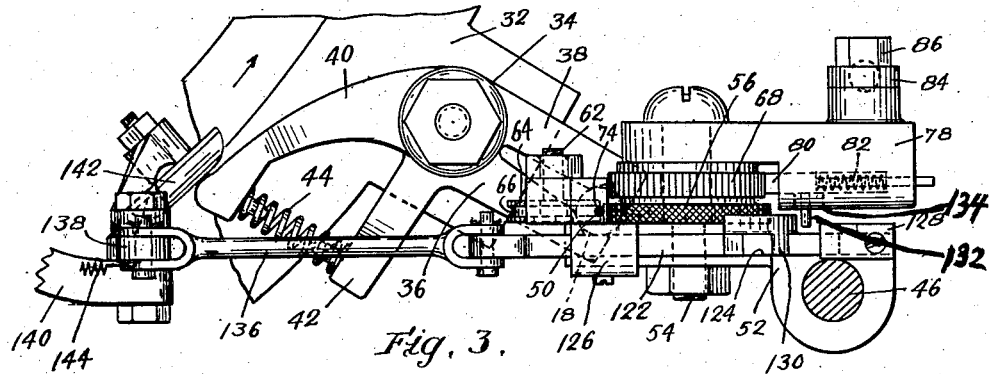
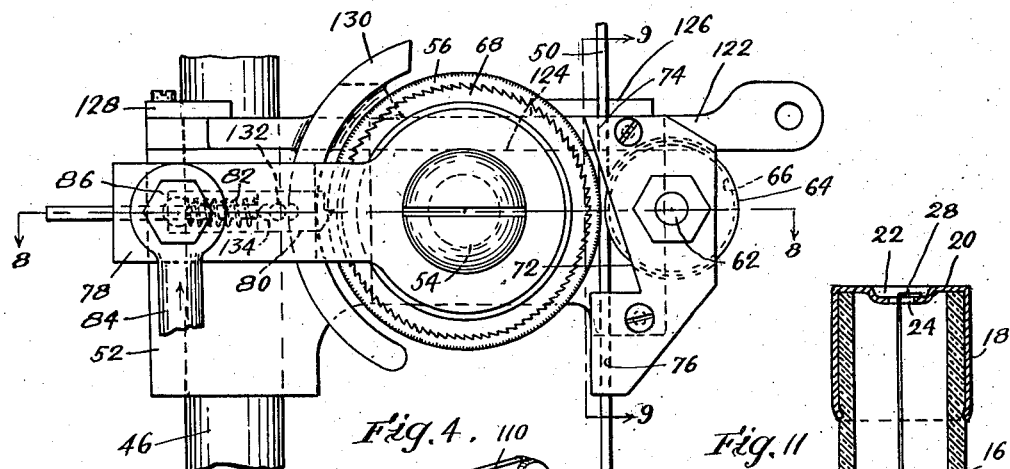
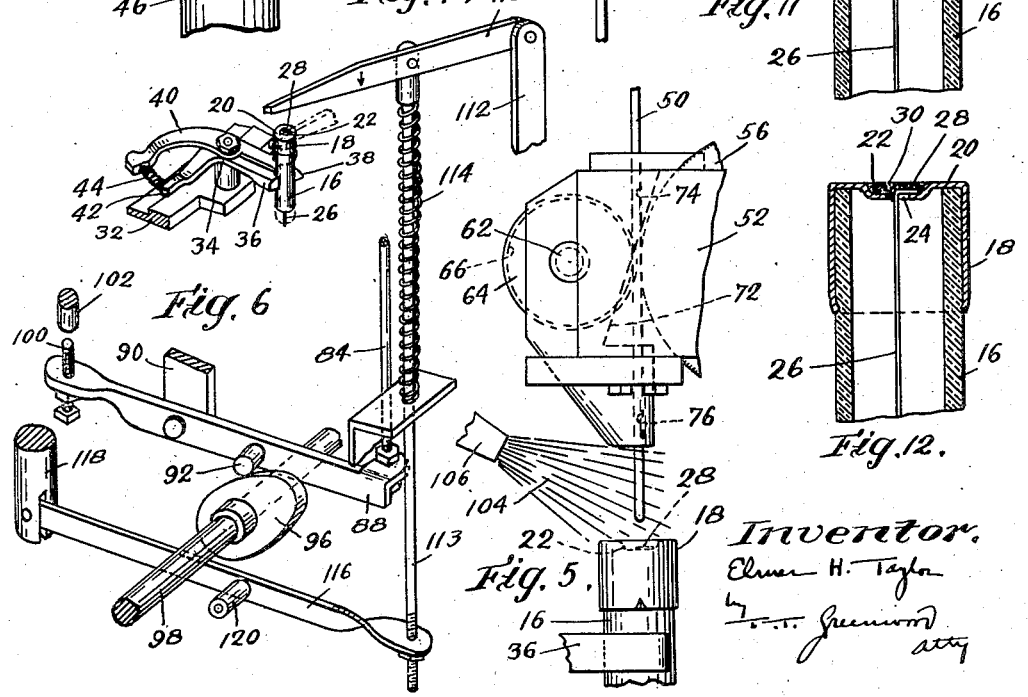
Inventor.
Elmer H. Taylor Patented Dec. 20, 1938

2,140,864

UNITED STATES PATENT OFFICE 2,140,864

FUSE SOLDERING MECHANISM

Elmer H. Taylor, Newburyport, Mass., assignor to The Chase-Shawmut Company, Newburyport, Mass., a corporation of Massachusetts Application February 14, 1936, Serial No. 63,905

17 Claims. (Cl. 113—59)

This invention relates to the manufacture of cartridge type electric fuses wherein the fusible element or link is located within a tubular enclosing casing of insulating material as fiber having end caps on the ends thereof to which the fuse link is electrically connected, as by soldering. The casing may also contain a loose filler of insulating arc-quenching material.

The invention relates in particular to mechanism for automatically soldering the fusible links to the end caps of the fuses.

One of the objects of the present invention is the provision of means to advance a succession of fuse casings, each having an end cap thereon and a fusible element mechanically engaged with the end cap, and automatically operative means to solder the fusible links to the end caps.

A further object of the invention is the provision of automatically operative mechanism for depositing a measured amount of molten solder upon the end cap and the end of the fusible link associated therewith.

Another object of the invention is a soldering mechanism wherein the fuse casings with end caps thereon and fusible links therein are advanced in successive step by step order and wherein measured amounts of a solder wire are intermittently advanced in timed relation to the advance of the fuse casings and the measured amounts of solder are melted and deposited upon the successive end caps.

A yet further object of the invention is the provision of soldering mechanism including a carrier for advancing successive fuse casings into and out of a soldering position, means for advancing measured amounts of solder to be melted and deposited upon successive casings, and mechanism so arranged that solder will be advanced and melted only when there is a fuse casing for receiving the solder.

Another object is generally to improve the construction and operation of automatic soldering mechanisms.

Fig. 1 is a side elevation of the essential elements of the soldering apparatus embodying the present invention.

Fig. 2 is a plan detail of Fig. 1.

Fig. 3 is an enlarged plan view of the solder feeding mechanism.

Fig. 4 is a side elevation of the mechanism of Fig. 3.

Fig. 5 is a detailed side elevation of the manner in which the solder is melted and deposited on the fuse casing.

Fig. 6 is a perspective view illustrating the mechanism for operating the feeding mechanism and also for adjusting the lever of the successive fuses.

Fig. 7 is a perspective view of the supporting bracket for the feeding mechanisms of Figs. 3 and 4.

Fig. 8 is a longitudinal section taken along line 8—8 of Fig. 4.

Fig. 9 is a section taken along line 9—9 of Fig. 4.

Fig. 10 is a perspective view of the feed stopping slide.

Fig. 11 is a sectional view of one end of a fuse casing showing the end cap thereon and the fusible element engaged with the end cap prior to the soldering operation.

Fig. 12 is a view similar to Fig. 11 but illustrating the link as soldered to the end cap.

The fuse casing operated on by the mechanism of the present invention, as illustrated in Fig. 11, comprises a tubular insulating casing 16 having a metal end cap 18 upon one end thereof. The end cap is provided with an end wall 20 which overlies the end of the casing and the end wall is provided with a centrally located recess or cup-shaped depression 22 which is provided with a link receiving aperture 24. A fusible element or link 26, generally although not necessarily of rectangular cross-section or of ribbon shape, is located within the fuse and is extended through the aperture 24 in the end cap and has a right angularly related end 28 that is located in the recess 22. The end portion 28 is longer than the dimensions of the aperture 24 so that the fuse link cannot drop out of the end cap during the advance of the fuse casing and the soldering thereof. A mass of solder 30 is applied in molten condition to the recess 22, see Fig. 12, and bonds the fuse link and the end cap securely electrically and mechanically together.

The fuse casings, as illustrated in Fig. 11, each with one end cap only thereon and a fuse link within the casing and suspended from the end cap, are advanced in a horizontal direction with the casings in vertical position and with the end cap uppermost. The successive casings are carried by a carrier 32, see Figs. 1, 2 and 3, that is advanced in a progressive step by step manner with stationary periods between its moving periods. The soldering operation is performed upon the stationary fuse casings. The carrier 32 is provided with a series of equally spaced casing grippers 34 each comprising a stationary jaw 36 and a pivoted jaw 38, between which pair of jaws a fuse casing is adapted to be gripped. The movable jaw 38 is provided with a tail 40 and the stationary jaw with an ear 42. A compression spring 44, located between and having its ends bearing respectively upon said tail and ear, serves to maintain the jaws in yielding pressure engagement with the fuse casing.

The soldering mechanism includes a vertical post or standard 46 which at its upper end provides a rotatable support for a reel or roll 48 of solder wire 50, the solder wire being of the type carrying its own flux. The solder wire is drawn downwardly off the roll by soldering mechanism which includes a pair of intermittently advanced feed rolls 56 and 64 maintained normally in constant gripping engagement with the wire.

The feeding mechanism is carried by a horizontally extended bracket 52 vertically adjustable on and secured to the post 46 beneath the solder reel and above the path of movement of the successive fuse casings. The bracket carries a stud shaft 54 which projects horizontally from one face of the bracket. The large feed roll 56 is journalled on said shaft and has a corrugated or roughened periphery for engagement with the solder wire. A wire guide bracket 58 is secured removably to the face of the supporting bracket 52 by screws 60 and has a stud screw 62 therein on which the small feed roll 64 is journalled, said roll being in line with the large roll 56. The small roll 64 is provided with a peripheral groove 66 in which the solder wire is located and by which it is retained from sidewise movement at its point of engagement with the feed roll 56.

The feed roll 56 is advanced intermittently by a ratchet wheel 68 which is journalled on the shaft 54 beside the feed roll and is in driving engagement therewith by a pin 70. Thus as said ratchet wheel 68 is advanced in an intermittent manner the feed roll 56 is advanced and consequently advances successive lengths of the fuse wire downwardly. The wire guide bracket 58, see especially Figs. 7 and 9, is provided with an inclined recessed portion 72 into which the peripheral portion of the small feed wheel 66 projects and along which the solder wire passes. The guide bracket 58 is provided with an upper wire passage 74 through which the wire passes into said recess 72 and a lower passage 76 through which the wire is fed to the fuse casing.

The ratchet wheel 68 is advanced in a step by step manner by an arm 78 which is pivoted on shaft 54 beside the ratchet wheel. Said arm 78 has a cylindrical pawl 80 therein which is urged in the direction of the ratchet wheel by a compression spring 82, the spring being adapted to yield on a back stroke of the arm 78 and permit the pawl to ride over the teeth of the ratchet wheel without engaging them to move the wheel. The arm 78 is oscillated by means of a connecting rod 84, see especially Figs. 1 and 6. The upper end of said connecting rod is pivoted on a bolt 86 screwed into the arm 78 and the lower end of the rod is pivoted to one end of a cam lever 88, which lever is pivoted intermediate its ends to a suitable supporting bracket 90. Between the connecting rod and the bracket 90 the lever 88 carries a cam roll 92 which is engaged and raised by a cam 96 fixed to a shaft 98, which rotates in timed relation to the advance of the carrier 32 so that the feeding mechanism is operated to deliver a measured amount of solder wire to each successive fuse casing presented to the feeding mechanism. The weights of the arm 78, the connecting rod 84, and the lever 88 are adapted to effect the back or idle stroke of the arm 78 when the high point of the cam passes the roller 92. The stroke of the arm 78 is adjusted by an adjusting screw 100 carried by the free end of the lever 88 and engageable with a suitable stop member 102. Once the screw 100 has been adjusted to effect the delivery of a satisfactory amount of solder the adjustment need not be changed unless the type of fuse casing is changed.

With the mechanism as described a measured amount of solder wire is delivered at each effective stroke of the arm 78 below the wire guide bracket 58 and vertically above the recess 22 in the end cap of the fuse casing.

A jet of flame 104 as from the nozzle of a gas burner 106 is constantly directed into the space between the end cap of the fuse casing and the wire guide bracket and onto the end cap.

The timing mechanism is such that the fuse casing is under the advanced portion of the wire when said portion begins to melt due to the heat of the flame and thus the molten solder falls into the recess 22, as illustrated in Fig. 12. The end cap is also adapted to be heated sufficiently to bond well with the solder. The carrier 32 and the fuse casing remain stationary under the feeding mechanism for a sufficient period of time to insure the melting of the solder and the depositing of the molten solder in the recess of the end cap. The carrier then advances to move the soldered fuse casing out of soldering position and to advance an unsoldered casing into soldering position, whereupon another length of solder wire is again advanced. After the carrier has advanced the soldered casing out of soldering position it remains stationary momentarily in another position, see Fig. 2, wherein a blast of air from an air pipe 108 is directed onto the hot end cap to cool the end cap and solidify the solder.

It is desirable to have the tops of all the fuse casings in the carrier at the same level and the same distance under the lower end of the wire guide bracket so that the action of the heat of the gas flame on the end caps and the solder will be the same for all fuses. Consequently means are provided to engage each fuse in the grippers prior to the advance of the fuse into soldering position, if a fuse stands higher than a predetermined level in the gripper, and to move the fuse downwardly into a predetermined position so that the tops of all fuse casings will be at the same level.

Said mechanism is illustrated in Figs. 1 and 6, and includes a lever 110 pivotally mounted at the upper end of a suitable stationarily supported bracket 112 and having its free end positioned to overlie the fuse casing next to the one that is in soldering position. The lever is moved downwardly toward the fuse by means including a connecting rod 113 which is encircled by a compression spring 114 that acts on the rod in a direction to raise the lever 110. The lower end of the connecting rod is connected to an arm 116 which underlies the cam 96 and is pivoted to a suitable support 118. Said arm carries a roller 120 which is adapted to be engaged by the cam 96 during its rotation to depress the arm 116 and consequently the arm 110. The throw of the cam and consequently of the lever 110 is constant so that all of the fuses engaged by the lever are moved downwardly between the jaws of the grippers and to the same relative position. The reciprocation of the height adjusting lever 110 is timed to occur when the casing carrier is stationary.

It sometimes happens that a gripper is advanced into a soldering position when it does not contain a casing. It is undesirable to feed solder when there is no casing to receive it and hence means is provided to prevent the operation of the feeding mechanism at the time a gripper that does not contain a fuse casing is in soldering position. Said means includes a slide 122 longitudinally movable in a slide way or groove 124, see especially Fig. 7, formed in the top face of the supporting bracket 52, the bracket having members 126 and 128 which overlie the top of the groove to retain the slide therein. The slide is provided with an arcuate cam member 130 which is vertically disposed between the bracket 52 and the reciprocating feed arm 78 and partly surrounds the feed roll 56. The pawl 80 of the feed arm 78 is provided with a laterally extended projection 132 that overlies the outer arcuate face of the cam 130 and is reciprocable in a longitudinally elongated slot 134 of the feed arm.

In the normal position of the cam member the feed arm is free to reciprocate without engagement between the cam member and the projection 132. When, however, the feed is to be interrupted the slide 122 is moved longitudinally of the bracket 52 to effect engagement of the cam member 130 and the projection 132 and the consequent retraction of the pawl 80 from operative engagement of the teeth of the ratchet wheel 68. The feed arm 78 is free to reciprocate under these conditions but cannot advance the ratchet wheel.

The movement of the slide 122 is effected through a connecting link 136, see Figs. 1 and 3, which is pivotally connected at one end to said slide and at the other end to the upper end of a vertical lever 138. Said lever is pivoted intermediate its ends to a suitable stationary bracket 140 and at its lower end carries a cam button 142 which is disposed beside the line of movement of the ends of the tails 40 of the grippers. When the grippers contain fuse casings between their jaws the position of the tails is such that they pass in front of the cam button 142 without engaging and moving it. When, however, there is no fuse casing between the jaws, the jaws are close together and hence the tail 40 is held in an outwardly displaced position by the spring 44 and thus is caused to engage and move the cam button and hence the lever associated with it during the advance of the carrier. This movement of the lever 138 effects the movement of the slide 122 into position to hold the pawl 80 out of engagement with the ratchet wheel during the feed stroke of the feed arm 78 in response to the positioning of the empty gripper in soldering position. A retractile spring 144 is connected with said lever 138 and serves to restore the parts to normal position when released by the advance of the empty gripper beyond soldering position.

I claim:

1. Soldering mechanism for electric fuses comprising an intermittently advanceable carrier having fuse holders movable into and out of a soldering position and having means providing a yielding pressure grip on the fuses therein, soldering mechanism for delivering solder to said fuses, and means movable into and out of engagement with the fuses for leveling the fuses in said holders prior to the advance of the fuses into soldering position.

2. Soldering mechanism for electric fuses comprising an intermittently advanceable carrier having fuse holders movable into and out of a soldering position and having means providing a yielding pressure grip on the fuses therein, soldering mechanism for delivering molten solder to said fuses, and means movable into and out of engagement with the fuses for leveling the fuses in said holders prior to the advance of the fuses into soldering position, said leveling means having operating means therefor operating in timed relation to the movement of said carrier.

3. Soldering mechanism for electric fuses comprising an intermittently advanceable carrier having fuse holders movable into and out of a soldering position and having means providing a yielding pressure grip on the fuses therein, soldering mechanism for delivering solder to the fuses in said holders, and reciprocating leveling means adapted for engagement with the fuses in said holders for adjusting the positions of the fuses in said holders prior to the advance of the fuses into soldering position.

4. Soldering mechanism for electric fuses comprising an intermittently advanceable carrier having fuse holders movable into and out of a soldering position and having means providing a yielding pressure grip on the fuses therein, soldering mechanism for delivering molten solder to the fuses, and fuse leveling means movable into engagement with the successive fuses in said holders prior to the advance of the fuses into soldering position for bringing all fuses into the same relative position with respect to said soldering mechanism.

5. Soldering mechanism for electric fuses comprising an intermittently advanceable carrier having fuse holders movable into and out of a soldering position and having means providing a yielding pressure grip on the fuses therein, soldering mechanism for delivering molten solder to the fuses, and fuse leveling means movable into engagement with the successive fuses in said holders prior to the advance of the fuses into soldering position for bringing all fuses into the same relative position with respect to said soldering mechanism, said leveling means including a reciprocating lever movable into and out of engagement with the successive fuses in the holders, and cam means operating in timed relation with the movements of said carrier for reciprocating said lever at the time a holder is in alignment therewith.

6. Soldering mechanism for electric fuses comprising an intermittently advanceable carrier having fuse holders movable into and out of a soldering position, said fuse holders comprising pairs of spring urged jaws adapted for frictional engagement with the fuses, soldering mechanism for delivering molten solder to the successive fuses in said holders, and fuse leveling means arranged for engagement with the successive fuses in said holders and adapted to move fuses endwise while engaged with the jaws of said holders for positioning all of said fuses in the same plane with respect to said soldering mechanism.

7. Soldering mechanism for electric fuses comprising an intermittently advanceable carrier having fuse holders movable into and out of a soldering position, said fuse holders comprising pairs of spring urged jaws adapted for frictional engagement with the fuses, soldering mechanism for delivering solder to the successive fuses in said holders, fuse leveling means arranged for engagement with the successive fuses in said holders and adapted to move fuses endwise while engaged with the jaws of said holders for positioning all of said fuses in the same plane with respect to said soldering mechanism, said leveling means including a reciprocating member movable in the axial direction of the fuse into and out of a predetermined position for moving the ends of the fuses into such a position, and means for reciprocating said member operating in timed relation with the movements of said carrier.

8. Soldering mechanism for electric fuses comprising means for advancing successive fuses into and out of a soldering position, stationarily-supported means providing a stationary gas flame to play close above the ends of the successive fuses, a stationary guideway disposed above the flame and the fuses, and feeding means for successively moving equal amounts of solder through said guideway and into the gas flame to cause the solder to melt and drop off the body of the wire and fall upon the successive fuses.

9. Soldering mechanism for electric fuses comprising means for advancing successive fuses into and out of a soldering position, solder feeding means including a stationary solder wire guide member terminated close above and in spaced relation with the tops of the successive fuses when they are in soldering position, means to advance successive equal lengths of fuse wire toward the successive fuses and outwardly of said guide member, and stationary means providing a stationary gas flame disposed under said guideway and above the projecting solder wire providing a gas flame to melt the successive lengths of wire to cause the molten solder to drop off the body of the wire and upon the successive fuses.

10. Soldering mechanism for electric fuses comprising means for advancing successive fuses into and out of a soldering position, a stationary solder wire guide member terminated above and in spaced relation with the successive fuses when they are in soldering position, means for advancing successive equal terminal lengths of solder wire through and beyond said stationary guide member and into the space between it and a fuse therebeneath, and stationary means providing a stationary gas flame in the space between said guide way and fuse and about the projecting solder wire for melting said exposed length of solder to cause the molten solder to drop off the body of the wire and upon the fuse.

11. Soldering mechanism for electric fuses comprising means for advancing a succession of fuses into and out of soldering position, a stationary solder wire guide member disposed above and in spaced relation with the ends of the successive fuses in soldering position, stationary means providing a stationary gas flame directed into the space between said guide member and the end of the fuse for melting solder exposed beneath the guide member and causing the molten solder to drop off the body of the wire and upon the fuses, feeding means including cooperating stationarily supported feed rolls engageable with a solder wire disposed therebetween for advancing said solder wire along said guide member and outwardly thereof into the flame, and means for advancing said feed rolls.

12. Soldering mechanism for electric fuses comprising an intermittently advanceable carrier having fuse holders movable into and out of a soldering position and having fuse-gripping and fuse-empty positions, solder feeding means for delivering molten solder to the fuses in soldering position, and means responsive to the fuse-empty positions of a fuse holder for temporarily arresting the feeding operation of said solder feeding means.

13. Soldering mechanism for electric fuses comprising an intermittently advanceable carrier having a plurality of fuse holders movable into and out of soldering position and having fuse-gripping and fuse-empty positions, solder-feeding means for delivering molten solder to the fuses in soldering position, and means responsive to the fuse-empty position of a holder for arresting the feeding and delivery action of said feeding means when said empty holder is in soldering position.

14. Soldering mechanism for electric fuses comprising an intermittently advanceable carrier having a plurality of fuse holders successively movable into and out of a soldering position, solder feeding means for delivering molten solder to the successive fuses in soldering position including coacting feed and idler rolls in driving engagement with the solder wire, a ratchet wheel fixed to said feed roll, a pivoted pawl arm oscillated in timed relation with the advance of said carrier, a pawl carried by said arm swinging about and engageable with said ratchet for advancing it intermittently, cam means pivoted concentrically with said feed roll movable into and out of a position wherein it holds said pawl from effective engagement with said ratchet, said cam having an arcuate cam face concentric with said feed roll on which said pawl can travel when engaged therewith, means for normally holding said cam means out of such position, and means responsive to the absence of a fuse from a holder for moving said cam means into such position whereby to prevent the feeding operation of said feeding means on an empty holder.

15. Soldering mechanism for electric fuses comprising an intermittently advanceable carrier having a plurality of fuse grippers movable into and out of a soldering position, said grippers each comprising a pair of jaws spring urged into engagement with a fuse therebetween, solder feeding means for delivering solder when the successive grippers are in soldering position, and means responsive to a predetermined relative position of said jaws of a gripper for controlling the feeding operation of said feeding means.

16. Soldering mechanism for electric fuses comprising an intermittently advanceable carrier having a plurality of fuse grippers movable into and out of a soldering position, said grippers each comprising a pair of jaws spring urged into engagement with a fuse therebetween, solder feeding means for delivering molten solder when the successive grippers are in soldering position, and means operative by and in response to the relative position of said jaws of a gripper when there is no fuse therebetween for preventing the feeding operation of said feeding means on an empty gripper.

17. Soldering mechanism for electric fuses comprising an intermittently advanceable carrier having a plurality of fuse grippers movable into and out of a soldering position, said grippers each comprising a pair of jaws having spring means urging them into engagement of a fuse therebetween, one of said jaws having a tail the position of which is indicative of the presence or absence of a fuse between the jaws, solder feeding means for delivering molten solder to the successive fuses in soldering position including an intermittently acting solder wire feed member, a disabling device for said feed member operative to prevent the feeding of solder, and operating means for said disabling means including a movable cam member disposed beside the line of movement of the tails of said jaws and adapted to be engaged and moved into an operated position by the tail of the jaw of an empty gripper, and means operatively connecting said cam means and said disabling device.

ELMER H. TAYLOR.